(12) United States Patent
Kjeldsen et al.

(10) Patent No.: US 8,155,872 B2
(45) Date of Patent: Apr. 10, 2012

(54) METHOD AND APPARATUS FOR INDOOR NAVIGATION

(75) Inventors: Frederik C. Kjeldsen, Poughkeepsie, NY (US); Anthony Levas, Yorktown Heights, NY (US); Gopal S. Pingali, Mohegan Lake, NY (US); Claudio S. Pinhanez, New York, NY (US); Mark E. Podlaseck, Kent, CT (US); Piyawadee Sukavitiya, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 1472 days.

(21) Appl. No.: 11/668,540

(22) Filed: Jan. 30, 2007

(65) Prior Publication Data

US 2008/0180637 A1  Jul. 31, 2008

(51) Int. Cl.
  *G01C 21/30* (2006.01)
  *G01C 21/32* (2006.01)
(52) U.S. Cl. ..... 701/208; 701/209; 340/990; 340/995.1; 340/995.19
(58) Field of Classification Search ............. 353/11–14; 348/832, 837; 365/63–64, 66, 52, 55; 701/200, 701/208–209; 340/990, 995.1, 995.19
See application file for complete search history.

(56) References Cited

U.S. PATENT DOCUMENTS

| | | | |
|---|---|---|---|
| 5,113,185 A * | 5/1992 | Ichikawa | 340/995.27 |
| 5,983,158 A * | 11/1999 | Suzuki et al. | 701/209 |
| 6,431,711 B1 | 8/2002 | Pinhanez | |
| 6,912,463 B2 * | 6/2005 | Miwa | 701/213 |
| 7,010,498 B1 | 3/2006 | Berstis | |
| 7,762,458 B2 * | 7/2010 | Stawar et al. | 235/383 |
| 7,898,438 B2 * | 3/2011 | Brosius, III | 340/995.27 |
| 8,024,112 B2 * | 9/2011 | Krumm et al. | 701/209 |
| 8,060,297 B2 * | 11/2011 | Couckuyt et al. | 701/200 |
| 2003/0046002 A1 * | 3/2003 | Miwa | 701/213 |
| 2004/0098753 A1 * | 5/2004 | Reynolds et al. | 725/135 |
| 2004/0109096 A1 * | 6/2004 | Anderson et al. | 348/832 |
| 2004/0167715 A1 * | 8/2004 | Miwa | 701/213 |
| 2006/0116816 A1 * | 6/2006 | Chao et al. | 701/210 |

(Continued)

FOREIGN PATENT DOCUMENTS

JP  10185606 A  *  7/1998

(Continued)

OTHER PUBLICATIONS

Steerable interfaces for pervasive computing spaces; Pingali, G.; Pinhanez, C.; Levas, A.; Kjeldsen, R.; Podlaseck, M.; Han Chen; Sukaviriya, N.; Pervasive Computing and Communications, 2003. (PerCom 2003). Proceedings of the First IEEE Inter. Conf. on; Digital Object Identifier: 10.1109/PERCOM.2003.1192755; Pub. Yr: 2003, pp. 315-322.*

(Continued)

*Primary Examiner* — Cuong H Nguyen
(74) *Attorney, Agent, or Firm* — Ryan, Mason & Lewis, LLP

(57) ABSTRACT

Techniques are provided for providing physical routes to target locations. The techniques include obtaining at least one target location from at least one user; determining at least one physical route to said at least one target location; and displaying said at least one determined physical route through a sequence of at least one sign display, wherein each sign display are configured to display a plurality of physical routes.

20 Claims, 3 Drawing Sheets

U.S. PATENT DOCUMENTS

| | | | |
|---|---|---|---|
| 2006/0158452 A1 | 7/2006 | Borger et al. | |
| 2006/0158521 A1 | 7/2006 | Babcock et al. | |
| 2006/0158616 A1 | 7/2006 | Borger et al. | |
| 2006/0241862 A1* | 10/2006 | Ichihara et al. | 701/209 |
| 2006/0251885 A1* | 11/2006 | Coggio et al. | 428/336 |
| 2007/0050132 A1* | 3/2007 | Ho et al. | 701/209 |
| 2007/0237948 A1* | 10/2007 | Coggio et al. | 428/336 |
| 2008/0160186 A1* | 7/2008 | Pokorny et al. | 427/162 |
| 2008/0180637 A1* | 7/2008 | Kjeldsen et al. | 353/11 |
| 2008/0238640 A1* | 10/2008 | Mori et al. | 340/435 |
| 2009/0143980 A1* | 6/2009 | Halters et al. | 701/209 |

FOREIGN PATENT DOCUMENTS

| | | | |
|---|---|---|---|
| JP | 2001-258529 | * | 8/2001 |
| JP | 2002331937 A | * | 11/2002 |
| TW | 318386 B1 | * | 12/2009 |

OTHER PUBLICATIONS

Provisional Patent Application entitled "Integrated Multi-Media Shopping System," by David George Brice, et al., filed Aug. 5, 2005, U.S. Appl. No. 60/705,776.*

Augmenting a Retail Environment Using Steerable Interactive Displays (2003), from http://www.research.ibm.com/people/p/pinhanez/publ http://www.research.ibm.com/ed/publications/chi03b DBLP by Noi Sukaviriya, Mark Podlaseck, Rick Kjeldsen, Anthony Levas, Gopal Pingali, Claudio Pinhanez.*

Ubiquitous interactive displays in a retail environment (2003), Download from:http://www.research.ibm.com/people/p/pinhanez/publ http://www.research.ibm.com/ed/publications/sketch Proceedings of SIGGRAPH Sketches.*

Developing a WAP Application for Mobile Retail Customers; Evans, C.; Bilal, M.; Pervasive Computing and Applications, 2007. ICPCA 2007. 2nd International Conference on; Digital Object Identifier: 10.1109/ICPCA.2007.4365463 Publication Year: 2007, pp. 328-332.*

Steerable interactive television: virtual reality technology changes user interfaces of viewers and of program producers Pose, R.; User Interface Conference, 2001. AUIC 2001. Proceedings. Second Australasian; Digital Object Identifier: 10.1109/AUIC.2001.906280; Publication Year: 2001, pp. 77-84.*

Proceedings Second Australasian User Interface Conference. AUIC 2001; User Interface Conference, 2001. AUIC 2001. Proceedings. Second Australasian; Digital Object Identifier: 10.1109/AUIC.2001.906269; Publication Year: 2001.*

Moving Out of the Lab: Deploying Pervasive Technologies in a Hospital; Hansen, T.R.; Bardram, J.E.; Soegaard, M.; Pervasive Computing, IEEE; vol. 5, Issue: 3; Digital Object Identifier: 10.1109/MPRV.2006.53; Publication Year: 2006, pp. 24-31.*

Consumer-Friendly Shopping Assistance by Personal Behavior Log Analysis on Ubiquitous Shop Space; Sae-Ueng, S.; Pinyapong, S.; Ogino, A.; Kato, T.; Asia-Pacific Service Computing Conference, The 2nd IEEE Digital Object Identifier: 10.1109/APSCC.2007.50; Publication Year: 2007, pp. 496-503.*

A ubiquitous computing environment composed by cooperation between visual markers and event-driven compact devices Kishino, Y.; Terada, T.; Tsukamoto, M.; Nishio, S.; Ubiquitous Data Management, 2005. UDM 2005. International Workshop on Digital Object Identifier: 10.1109/UDM.2005.1; Publication Year: 2005, pp. 86-93.*

Public Ubiquitous Computing Systems: Lessons from the e-Campus Display Deployments; Storz, O.; Friday, A.; Davies, N.; Finney, J.; Sas, C.; Sheridan, J.G.;Pervasive Computing, IEEE vol. 5, Issue: 3; Digital Object Identifier: 10.1109/MPRV.2006.56; Publication Year: 2006, pp. 40-47.*

Indoor Navigation Integration Platform for firefighting purposes: Rüppel, U.; Stübbe, K.M.; Zwinger, U.; Indoor Positioning and Indoor Navigation (IPIN), 2010 International Conference on; Digital Object Identifier: 10.1109/IPIN.2010.5647401 Publication Year: 2010, pp. 1-6.*

Vision-based location positioning using augmented reality for indoor navigation; Jongbae Kim; Heesung Jun; Consumer Electronics, IEEE Transactions on; vol. 54, Issue: 3; Digital Object Identifier: 10.1109/TCE.2008.4637573 Publication Year: 2008, pp. 954-962.*

A GNSS/INS-based architecture for rescue team monitoring; Croci, A.; De Agostino, M.; Manzino, A.M.; Indoor Positioning and Indoor Navigation (IPIN), 2010 International Conference on; Digital Object Identifier: 10.1109/IPIN.2010.5646740 Publication Year: 2010, pp. 1-7.*

Localization in industrial halls via ultra-wideband signals; Zwirello, L.; Janson, M.; Ascher, C.; Schwesinger, U.; Trommer, G.F.; Zwick, T.; Positioning Navigation and Communication (WPNC), 2010 7th Workshop on; Digital Object Identifier: 10.1109/WPNC.2010.5649369; Publication Year: 2010, pp. 144-149.*

A SDBMS-Based 2D-3D Hybrid Model for Indoor Routing; Hyeyoung Kim; Chulmin Jun; Hyunjin Yi; Mobile Data Management: Systems, Services and Middleware, 2009. MDM '09. Tenth International Conference on; Digital Object Identifier: 10.1109/MDM.2009.124; Publication Year: 2009, pp. 726-730.*

Autonomous humanoid robot navigation using augmented reality technique; Mohareri, O.; Rad, A.B.; Mechatronics (ICM), 2011 IEEE International Conference on; Digital Object Identifier: 10.1109/ICMECH.2011.5971330; Publication Year: 2011, pp. 463-468.*

Mapping indoor environments based on human activity; Grzonka, S.; Dijoux, F.; Karwath, A.; Burgard, W.; Robotics and Automation (ICRA), 2010 IEEE International Conference on; Digital Object Identifier: 10.1109/ROBOT.2010.5509976 Publication Year: 2010, pp. 476-481.*

Map building for mobile robot based on distributed control technology; Songmin Jia; Ke Wang; Xiuzhi Li; Wei Cui; Jinhui Fan; Jinbo Sheng; Information and Automation (ICIA), 2011 IEEE International Conference on; Digital Object Identifier: 10.1109/ICINFA.2011.5949002; Publication Year: 2011, pp. 279-284.*

Visible light communications: Challenges and possibilities; O'Brien, D.C.; Zeng, L.; Le-Minh, H.; Faulkner, G.; Walewski, J.W.; Randel, S.; Personal, Indoor and Mobile Radio Communications, 2008. PIMRC 2008. IEEE 19th International Symposium on Digital Object Identifier: 10.1109/PIMRC.2008.4699964; Publication Year: 2008, pp. 1-5.*

SLAM for Indoor Environment Using Stereo Vision; Hsun-Hao Chang; Shang-Yen Lin; Yung-Chang Chen; Intelligent Systems (GCIS), 2010 Second WRI Global Congress on; vol. 2; Digital Object Identifier: 10.1109/GCIS.2010.75 Publication Year: 2010, pp. 266-269.*

Assessment of impact of variable message signs on traffic surveillance in Kuala Lumpur; Roshandeh, A.M.; Puan, O.C.; Intelligence and Security Informatics, 2009. ISI '09. IEEE International Conference on; Digital Object Identifier: 10.1109/ISI.2009.5137309; Publication Year: 2009, pp. 223-225.*

Noi Sukaviriya et aL, "Embedding Interactions in a Retail Store Environment: The Design and Lessons Learned"; www.research.ibm.com/ed/publications/interact03.pdf.

Claudio Pinhanez et al., "Ubiquitous Interactive Displays in a Retail Environment", www.research.ibm.com/ed/publications/sketches03.pdf.

Noi Sukaviriya et al., "Augumenting a Retail Environment Using Steerable Interactive Displays"; www.research.ibm.com/ed/publications/chi03b.pdf.

Claudio Pinhanez et al, Applications of Steerable Projector-Camera Systems; lear inrialpes fr/ /events/iccv03/cdrom/procams03/pinhanez_kjeldsen_levas_pingali_podlaseck_sukaviriya.pdf.

* cited by examiner

METHOD AND APPARATUS FOR INDOOR NAVIGATION

FIELD OF THE INVENTION

The present invention generally relates to information technology, and, more particularly, to a method and apparatus for indoor navigation.

BACKGROUND OF THE INVENTION

Determining the location and the path to a location in a complex environment (e.g. finding where sugar is located in a supermarket) is a general problem for which many alternative solutions exist. The three most common solutions involve the use of printed maps, direction signs, and verbally asking for directions. In the case of maps, a user has to find his desired destination on the map, his or her current position, and "compute" the path to the destination. Further, the user has to navigate the real environment using the path found on the map system. Many people experience difficulties when attempting to transform a path represented on a map to a path in the real environment. Also, if the user is unable to carry the map and gets lost while following the path towards the desired target, he or she has to either return to the original map location, or search for another map in the real environment.

In the case of static direction signs positioned on walls or ceilings, the size (area) of the physical signs puts a limit on the number of sites to which the signs can be point. Verbally asking for directions involves finding another person knowledgeable about the environment, understanding and memorizing the verbal instructions (an error-prone interaction), and following the path. Many people are uncomfortable about asking for directions, and interpreting and memorizing verbal instructions is difficult and often prone to mistakes.

Interactive direction systems have been previously proposed. For example, Sukaviriya et al. disclose "Augmenting a Retail Environment Using Steerable Interactive Displays," which teaches a retail environment in which information interactions occur in situ, within the actual space of the merchandise. By combining a steerable projected display and recognition of user gestures and actions and user position tracking through peripheral cameras, interaction techniques are developed, designed to augment the reality of a retail store.

As an additional example, Pinhanez et al. disclose "Applications of Steerable Projector-Camera Systems," which teaches using steerable projector-camera systems employing computer vision to realize such "steerable interfaces." New kinds of applications enabled by steerable interfaces are illustrated, and the challenges imposed on computer vision are discussed through the presentation of four application prototypes: a collaborative assembly task coordinator; a multi-surface presentation viewer; a ubiquitous product finder for retail environments; and an interactive merchandise shelf.

Also, Sukaviriya et al disclose "Embedding Interactions in a Retail Store Environment: The Design and Lessons Learned," which teaches a steerable interface system that can direct graphical displays to any desirable locations, can capture interactions at any desirable locations, and can track user locations in a 3-dimensional space. A retail stoic application is discussed where a set of advanced technologies is applied to bring more information to users in the shopping context. The design challenges are presented for the interaction paradigm and findings from the design walk-through session with users are reported.

As another example, Pinhanez et al disclose "Ubiquitous Interactive Displays in a Retail Environment," which teaches a steerable projector-camera system used in a stoic to transform ordinary surfaces into interactive displays where customers look up products. Directions to products are projected on signage boards hung around the store.

It would thus be desirable to overcome the limitations in previous approaches.

SUMMARY OF THE INVENTION

Principles of the present invention provide techniques for providing physical routes to target locations. An exemplary method (which can be computer-implemented) for providing physical routes to target locations, according to one aspect of the invention, can include steps of obtaining at least one target location from at least one user; determining at least one physical route to the at least one target location; and displaying the at least one determined physical route through a sequence of at least one sign display, wherein each sign display is configured to display a plurality of physical routes.

One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

One or mole embodiments of the invention may provide one or more beneficial technical effects, such as, for example, facilitating the task of finding or regaining directions when a user is lost. Also, one or more embodiments of the invention may provide the beneficial effect of precluding the need for printed maps and human interaction to facilitate navigation of a complex environment.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
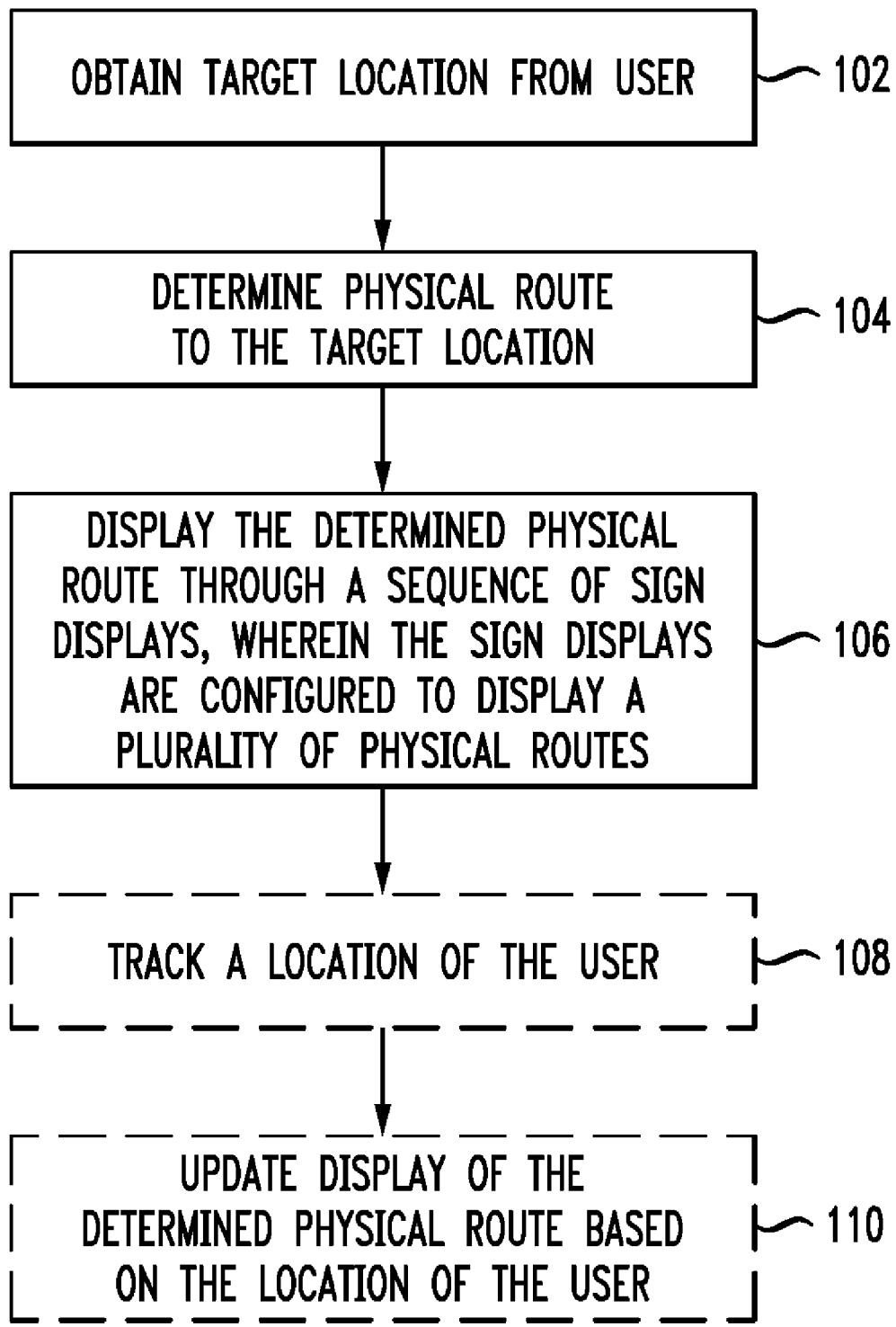
FIG. 1 is a flow diagram illustrating a method for providing physical routes to target locations, according to one embodiment of the invention.

FIG. 1 shows a flow diagram illustrating a method for providing physical routes to target locations, according to one embodiment of the invention. Step 102 includes obtaining at least one target location from at least one user. Step 104 includes determining at least one physical route to the at least one target location. Step 106 includes displaying the at least one determined physical route through a sequence of at least one sign display, wherein each sign display is configured to display a plurality of physical routes. Optionally, the method illustrated in FIG. 1 can also include step 108, tracking a location of the at least one user, and step 110, updating display of the determined physical route based on the location of the at least one user.

Figure 2:
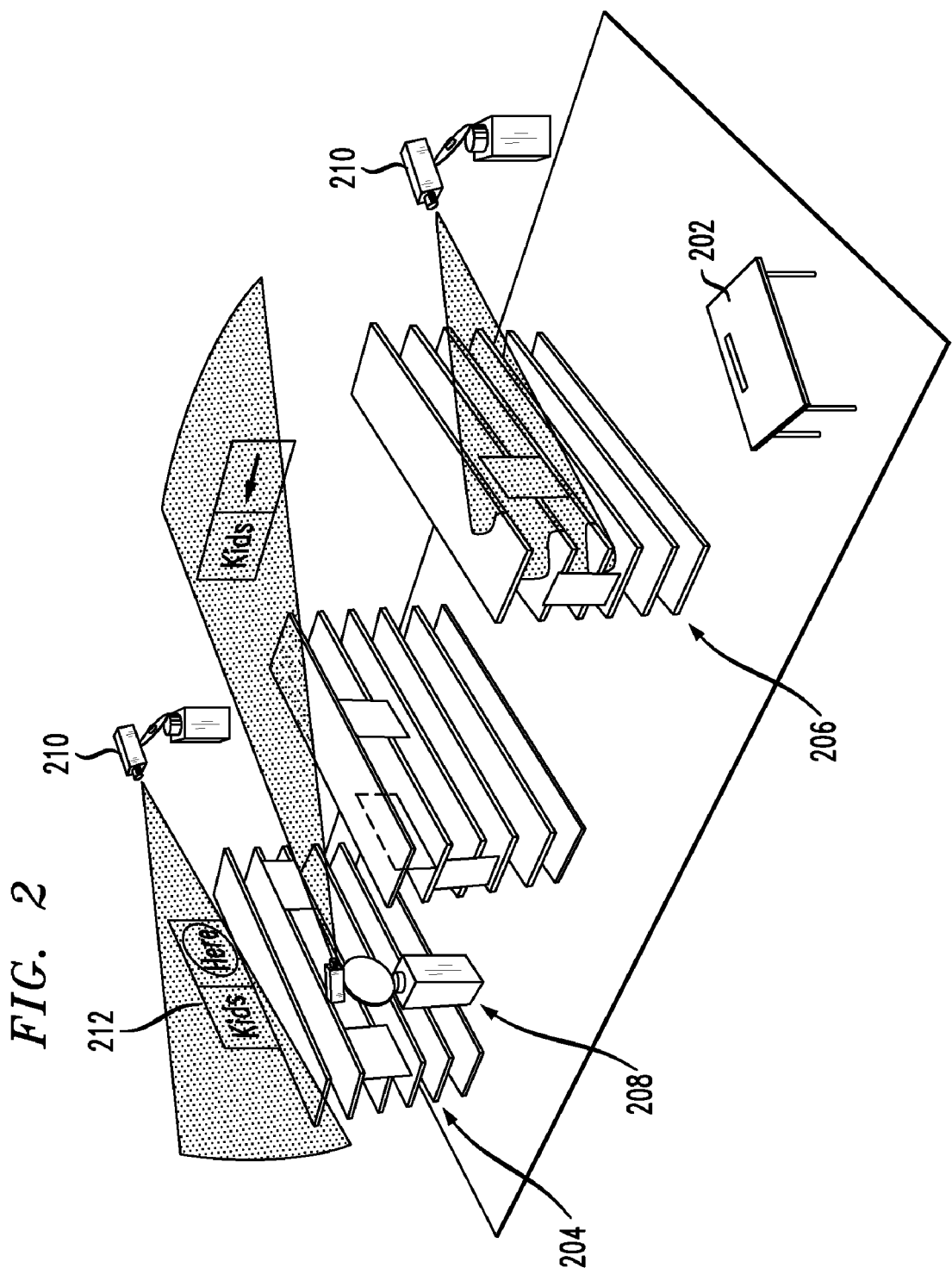
FIG. 2 is a block diagram illustrating a method for providing physical routes to target locations, according to one embodiment of the invention.

FIG. 2 shows a block diagram illustrating a method for providing physical routes to target locations, according to one embodiment of the invention. The system 200 comprises components including a search display 202 used to obtain at least one target location from at least one user, a sign display 212, and/or a sign display 204, and/or a sign display 206. Optionally, the system 200 may comprise a projector 208 and/or a projector 210.

One or more embodiments of the invention overcome the above-noted limitations of current indoor navigation help systems such as maps, direction signs, or people by using displays that direct a user to the location of a target in the environment, or by showing target-specific direction signs along the path to a target. One or more embodiments of the invention may also facilitate the task of finding or regaining directions when a user is lost.

One or more embodiments of the invention employ a set of displays to provide information to a user. The displays are used to provide two different functionalities. First, the displays provide interactive displays for searching for objects and/or locations, referred herein as "search displays." Second, the displays convey directions, referred to herein as "sign displays." As a means of example, search displays may be spread throughout an environment. A user may approach a search display and indicate a target location sought, by, for example, typing, selecting from a list, or some other interactive indication. The sign displays can be positioned so they can be easily seen from many different viewpoints in the environment (e.g. hanging from the ceiling, on top of shelves, embedded on walls). Once the desired target location is identified by the system, the target or the path to the target from the current user position is shown using a sequence of at least one sign display. If the complete path cannot be seen from the current position of the user, the system may provide a partial path, e.g. a path to the next search display along the path to the target, or similar information.

Unlike in the case of maps or directions, in one aspect of the invention the user is directly shown the actual target position in the environment through displays positioned in the environment. There is no need for the user to convert a path on a map into an actual route in the real environment. This aspect of the invention facilitates the task of following an indicated path to get to a desired target. Unlike the case of static signage, one or more embodiments of the invention provide a specific path, relevant for the user, shown for a limited amount of time, enabling different users to share an adaptive signage system customized for specific user queries. Unlike asking for directions, no human contact is involved in one or more embodiments of the invention.

In one embodiment of the invention, the invention comprises at least one display used to create interfaces for a user (search displays) and/or display directions (sign displays). If more than one computer controls the displays, the computers may be connected through a network system, wired or wireless.

In another embodiment of the invention, the invention comprises a database that lists all the available targets in the environment, as well as the location and/or name of all search displays and sign displays. A computer program running on each computer associated to the search displays creates and manages a user interface. Using traditional selection or search interface methods (e.g. menus, lists, keyword search, map selection), the user selects a target location. The target location in addition to the search display location or name are sent to another program or subroutine that consults the database and determines the path from the search display to the target location and the sign displays that can be used to convey the information to the user. The sequence of at least one sign display to be used can be, for example, pie-stored (e.g. the path from every search display to every target location is pre-computed), or computed using geometrical information about the environment, the current user position, the position of the search displays, the position of the sign displays, and the target position, or any group thereof.

The sequence of at least one sign display that shows the path, in addition to any other information such as supporting visual graphics (e.g. arrows, icons), is sent to the program or subroutine that controls the sign displays. This program controls the activation of images and/or text on the sign displays, as well as the corresponding timing and sequence of sign display activity. Optionally, this program can also coordinate situations wherein multiple users are receiving path information at the same time, ensuring appropriate timing and sharing of the sign displays.

The search and sign displays can be created using multiple devices. For example, television monitors, liquid crystal display (LCD) and plasma flat screens, light-emitting diode (LED) displays, electronic paper (e-paper), and similar devices may be used for implementation purposes. The search displays may include input capabilities such as, for example, mouse, keyed device such as a keyboard or keypad, touch screens, or similar input devices. Alternatively, the sign displays may be created using computerized projectors directed towards, for example, screens, paper and cardboard surfaces, or any other similar surface.

Alternatively, the search displays may be implemented using projectors and an input device mounted on the projected surface. If the projector is mounted out of reach of users, the opportunity for vandalism and theft is significantly reduced, which is an advantage for public spaces such as, for example, stores, information lobbies, or similar spaces. If one or more steerable interactive projected display system is used (e.g. the system described in U.S. Pat. No. 6,431,711), changes in the location of the search displays can be easily performed, improving the adaptability of the invention to environmental changes. Similarly, a steerable system may allow the provision of the interface on multiple surfaces in the environment or part of it using one single device. In this case, a device to call and start the interface on a specific surface is required, such as, for example, electronic buttons, inflated sensors, or similar devices.

Also, one or more steerable projected display systems can be used (e.g. the system described in U.S. Pat. No. 6,431,711) to render the direction signs on surfaces of the environment. An advantage of using steerable displays to implement the direction signs is the possibility of significantly decreasing the number of display devices required, through sharing of the projection devices. Also, a steerable display allows mole flexibility on the positioning and modification of the display signs, as well as the use of unusual surfaces such as, for example, floors and ceilings, as displays. Alternatively, both search and sign displays can be created by steerable interactive projected display systems.

By way of summary and amplification, in one or more embodiments, at least one search display can be associated with at least one search display projected surface and configured with a search display input device mounted on the search display projected surface, and at least one sign display can be associated with at least one sign display projected surface and configured with a sign display input device mounted on the sign display projected surface.

In one embodiment of the invention, the sign displays may be used for advertisement or similar information provision when they are not being used to give directions. Similarly, search displays may also be used for other functions besides generating directions such as, for example, general purpose and/or interaction access points, as well as for advertisement.

In another embodiment of the invention, the invention is configured to track the user as he or she follows the path towards the target location. If the location of the user is known, it is possible to display directions as he or she moves, using one or mole sign displays that are visible from the user's viewpoint, to provide instructions for the next step. In this embodiment, the system may modify the path as the user moves along, so as to compensate for deviations from the calculated path as a result of the user becoming lost or distracted.

In an alternative embodiment, the search display may be realized using a personal portable device such as, for example, a personal digital assistant (PDA), or a cell phone, that is able to connect to the navigation system, or mobile computer system attached to a mobile base such as a tablet PC mounted in a supermarket cart. In this embodiment, the search display interface is seen on the screen of the personal device, allowing the selection of the target using the input modalities of the personal device. After the target location is selected and the current position provided (manually or automatically), a program running on the navigation system can select and display the appropriate path on the sign displays.

In yet another embodiment, the target selection may be performed using speech recognition or audio menus, running either on environmental search displays, or on personal devices, or on cart-mounted displays. Indicating the target location can thus be implemented via speech recognition, or via combining speech with a keyed interactive device.

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 3:
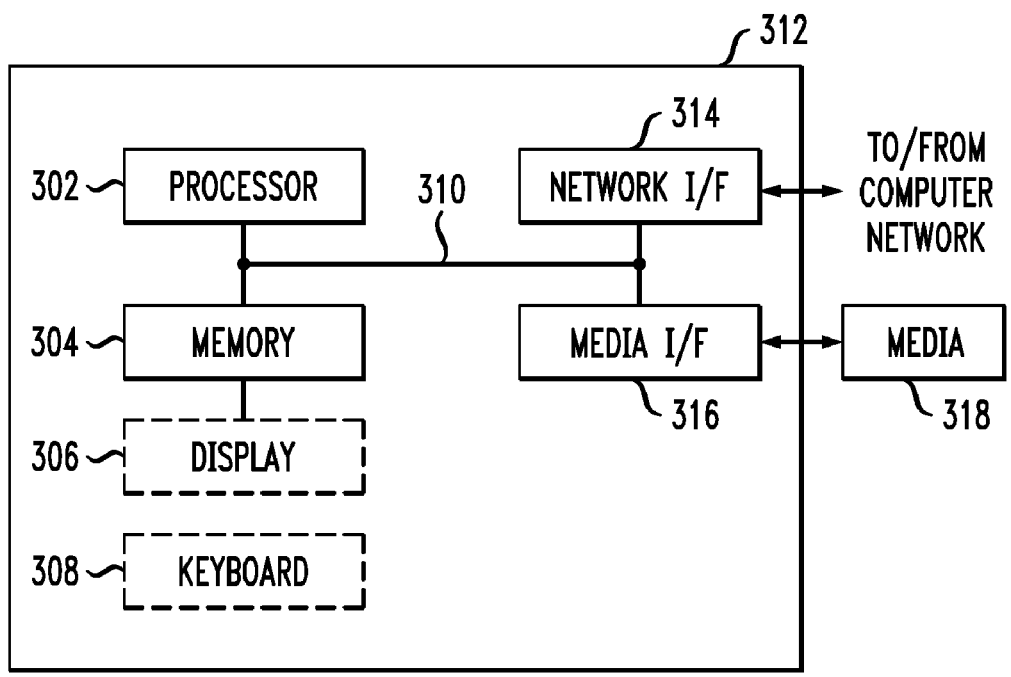
FIG. 3 is a system diagram of an exemplary computer system on which one or mole embodiments of the present invention can be implemented.

One implementation of the present invention makes substantial use of software running on a general purpose computer or workstation. With reference to FIG. 3, such an implementation might employ, for example, a processor 302, a memory 304, and an input and/or output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 302, memory 304, and input and/or output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 304), magnetic tape, a removable computer diskette (for example media 318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem, wireless cards, and Ethernet cards are just a few of the currently available types of network adapter's.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing physical routes to target locations, comprising the steps of:
   obtaining at least one target location from at least one user;
   determining at least one physical route to said at least one target location; and
   displaying said at least one determined physical route through a sequence of at least one sign display, wherein each sign display is configured to simultaneously display a plurality of said determined physical routes, wherein at least two of said plurality of determined physical routes are each associated with a different user, and wherein one or more of said steps are performed by a processor.

2. The method of claim 1, wherein said obtaining step comprises said at least one user indicating said at least one target location to at least one search display.

3. The method of claim 2, wherein said at least one search display comprises at least one of a television monitor, a liquid crystal display (LCD) flat screen, a plasma flat screen, a light emitting diode (LED) display, and an electronic paper (e-paper) display.

4. The method of claim 2, wherein said at least one search display is configured to obtain inputs from at least one of a mouse, a keyboard and a touch screen.

5. The method of claim 2, wherein said at least one search display and said at least one sign display are implemented with at least one projector.

6. The method of claim 2, wherein:
   said at least one search display is associated with at least one search display projected surface and configured with a search display input device mounted on said search display projected surface; and
   said at least one sign display is associated with at least one sign display projected surface and configured with a sign display input device mounted on said sign display projected surface.

7. The method of claim 2, wherein said at least one search display and said at least one sign display are implemented with at least one steerable projected display system.

8. The method of claim 2, wherein said at least one search display is configured to be accessed by said at least one user through a personal portable device.

9. The method of claim 2, wherein said indicating step is implemented at least via speech recognition.

10. The method of claim 2, wherein said indicating step is implemented at least via combining speech with a keyed interactive device.

11. The method of claim 1, wherein said route is pre-stored and said determining step comprises recalling said at least one pre-stored physical route to said at least one target location.

12. The method of claim 1, wherein said determining step comprises computing said at least one physical route to said at least one target location based on available information.

13. The method of claim 1, wherein each sign display comprises at least one of a television monitor, a liquid crystal display (LCD) flat screen, a plasma flat screen, a light emitting diode (LED) display, and an electronic paper (e-paper) display.

14. The method of claim 1, further comprising the additional steps of:
   tracking a location of said at least one user; and
   updating display of said determined physical route based on said location of the at least one user.

15. The method of claim 1, further comprising the additional step of displaying advertising on said at least one sign display during a time when physical route display is not required.

16. An apparatus for providing physical routes to target locations, comprising:
   a memory; and
   at least one processor coupled to said memory and operative to:
   obtain at least one target location from at least one user;
   determine at least one physical route to said at least one target location; and
   display said at least one determined physical route through a sequence of at least one sign display, wherein each sign display is configured to simultaneously display a plurality of said determined physical routes and wherein at least two of said plurality of determined physical routes are each associated with a different user.

17. The apparatus of claim 16, wherein said processor is operative to obtain said at least one target location from said at least one user via obtaining an indication of said at least one user indicating said at least one target location to at least one search display.

18. The apparatus of claim 16, wherein said at least one processor is further operative to:
   track a location of said at least one user; and
   update display of said determined physical route based on said location of the at least one user.

19. A computer program product comprising a computer useable medium having computer useable program code for providing physical routes to target locations, said computer program product including:
   computer useable program code for obtaining at least one target location from at least one user;
   computer useable program code for determining at least one physical route to said at least one target location; and
   computer useable program code for displaying said at least one determined physical route through a sequence of at least one sign display, wherein each sign display is configured to simultaneously display a plurality of said determined physical routes and, wherein at least two of said plurality of determined physical routes are each associated with a different user.

20. The computer program product of claim 19, wherein:
   said computer usable program code for obtaining said at least one target location from said at least one user comprises computer usable program code for obtaining an indication of said at least one user indicating said at least one target location to at least one search display.

* * * * *